(12) United States Patent
Wenger et al.

(10) Patent No.: US 7,448,795 B2
(45) Date of Patent: Nov. 11, 2008

(54) PRECONDITIONER HAVING MIXER SHAFTS INDEPENDENTLY DRIVEN WITH VARIABLE FREQUENCY DRIVES

(75) Inventors: LaVon Wenger, Sabetha, KS (US); Marc Wenger, Sabetha, KS (US); Michael J. Strahm, Sabetha, KS (US)

(73) Assignee: Wenger Manufacturing, Inc., Sabetha, KS (US)

( * ) Notice: Subject to any disclaimer, the term of this patent is extended or adjusted under 35 U.S.C. 154(b) by 183 days.

(21) Appl. No.: 11/551,997

(22) Filed: Oct. 23, 2006

(65) Prior Publication Data
US 2008/0094939 A1    Apr. 24, 2008

(51) Int. Cl.
*B01F 7/04* (2006.01)

(52) U.S. Cl. .......... 366/301; 366/141; 366/325.2; 366/601; 318/5; 388/936; 426/519

(58) Field of Classification Search .......... 366/66, 366/96–99, 141, 291, 297–301, 323, 325.2, 366/601; 426/519; 318/4, 5, 8; 388/936
See application file for complete search history.

(56) References Cited

U.S. PATENT DOCUMENTS

| | | | | | |
|---|---|---|---|---|---|
| 299,766 | A | * | 6/1884 | Farmer | 366/149 |
| 1,411,103 | A | * | 3/1922 | Clifford | 366/97 |
| 1,767,102 | A | * | 6/1930 | Busch | 366/297 |
| 3,332,368 | A | * | 7/1967 | Stickelber | 165/299 |
| 3,334,873 | A | * | 8/1967 | Stickelber | 366/91 |
| 3,901,482 | A | * | 8/1975 | Kieffaber | 366/85 |
| 4,752,139 | A | * | 6/1988 | Hauck | 366/298 |
| 5,087,864 | A | * | 2/1992 | Abel | 318/34 |
| 5,161,888 | A | * | 11/1992 | Hauck | 366/299 |
| 5,332,588 | A | * | 7/1994 | Capodieci | 426/231 |
| 5,460,448 | A | * | 10/1995 | Woolsey | 366/301 |
| 6,109,779 | A | * | 8/2000 | Weinekotter et al. | 366/193 |
| 6,247,394 | B1 | * | 6/2001 | Huber et al. | 99/352 |
| 6,340,487 | B1 | * | 1/2002 | Wenger et al. | 426/231 |
| 6,387,429 | B1 | * | 5/2002 | Huber et al. | 426/516 |
| 6,465,029 | B2 | * | 10/2002 | Wenger et al. | 426/231 |
| 6,482,453 | B2 | * | 11/2002 | Wenger et al. | 426/231 |
| 2008/0094939 | A1 | * | 4/2008 | Wenger et al. | 366/301 |

(Continued)

OTHER PUBLICATIONS

Kansas State University; Dept of Grain Science and Industry; Testing Mixer Performance; Tim Herrman, Keith Behnke; Oct. 1994.

(Continued)

*Primary Examiner*—Charles E Cooley
(74) *Attorney, Agent, or Firm*—Hovey Williams LLP

(57) ABSTRACT

An improved, dual-shaft preconditioner (10, 70) is provided having independent drive mechanism (18, 20, 78, 80) operatively coupled with a corresponding preconditioner shaft (14, 16, 74, 76) and permitting selective rotation of the shafts (14, 16, 74, 76) at rotational speeds and directions independent of each other. The mechanisms (18, 20, 78, 80) are operatively coupled with a digital controller (60) to allow rotational speed and direction control. Preferably, the preconditioner (10, 70) is supported on load cells (62, 100) also coupled with controller (60) to permit on-the-go changes in material retention time within the preconditioner (10, 70). The preconditioner (10, 70) is particularly useful for the preconditioning and partial gelatinization of starch-bearing feed or food materials.

24 Claims, 4 Drawing Sheets

U.S. PATENT DOCUMENTS

2008/0095910 A1* 4/2008 Wenger et al. .............. 426/557

OTHER PUBLICATIONS

Wenger Mfg, Inc; Determining Average Retention Time in a Preconditioner/Average Retention Time Distribution in a Preconditioner; Nov. 22, 2000.

Case Western Reserve University; Dept of Macromolecular Science; Dispersive and Distributive Mixing Characterization in Extrusion Equipment; Winston Wang, Ica Manas-Zloczower, date unknown.

Case Western Reserve University; Dept of Macromolecular Science; Analysis of Mixing in Polymer Processing Equipment; Ica Manas-Zloczower, date unknown.

Wikipedia, the Free Encyclopedia; Coefficient of Variation; http://en.wikipedia.org/wiki/Coefficient_of_variation; Jun. 5, 2006.

* cited by examiner

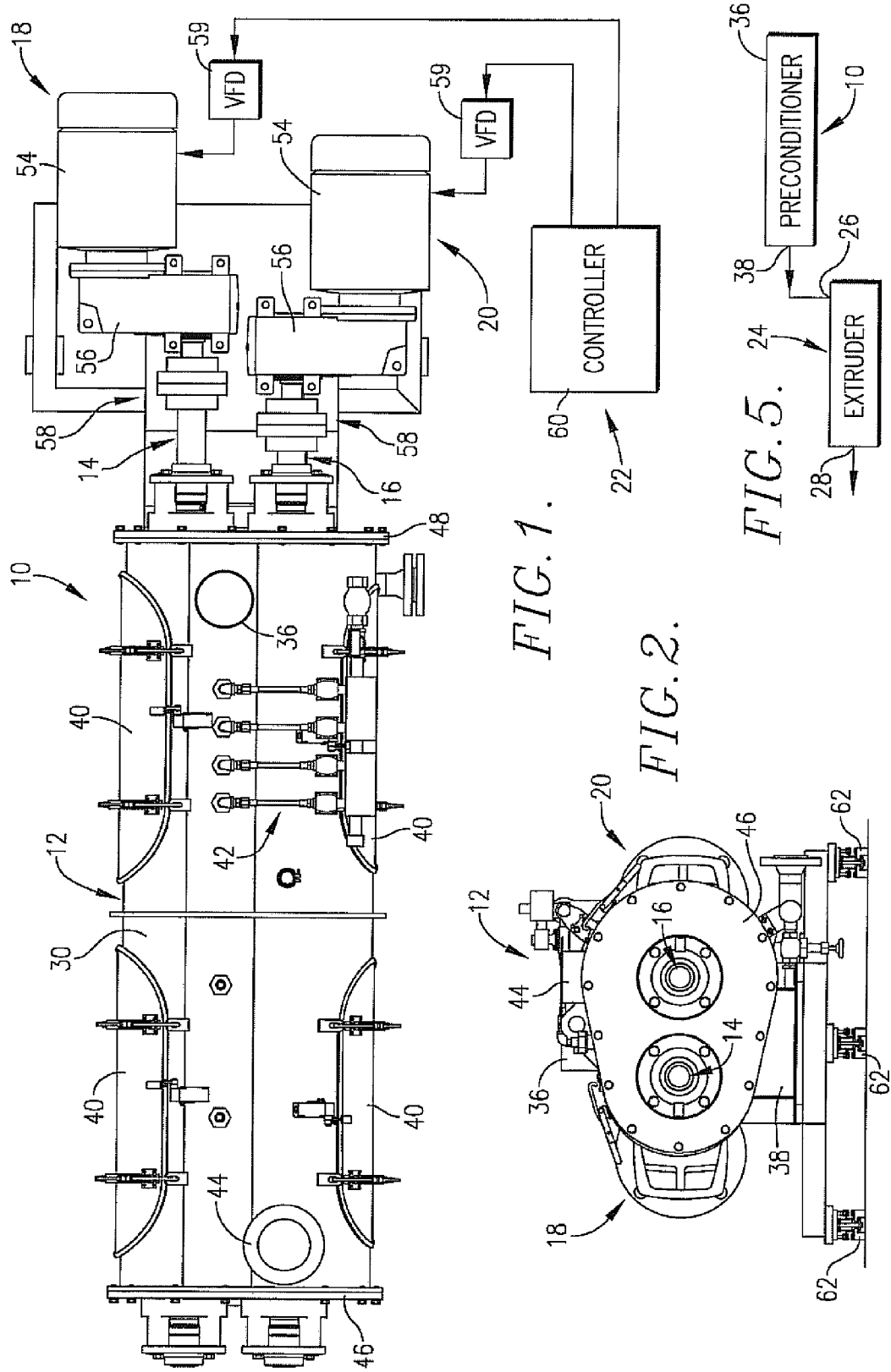

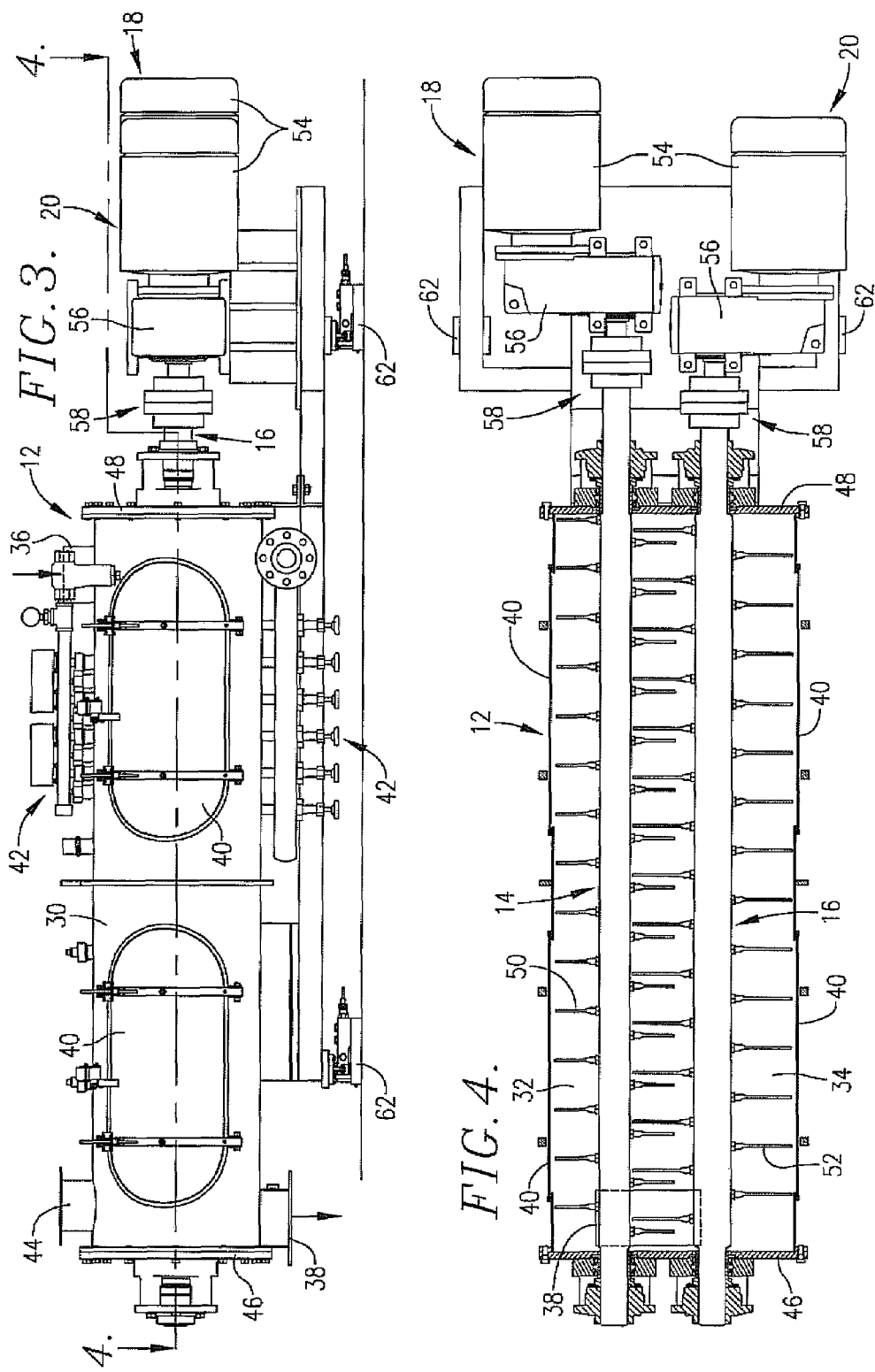

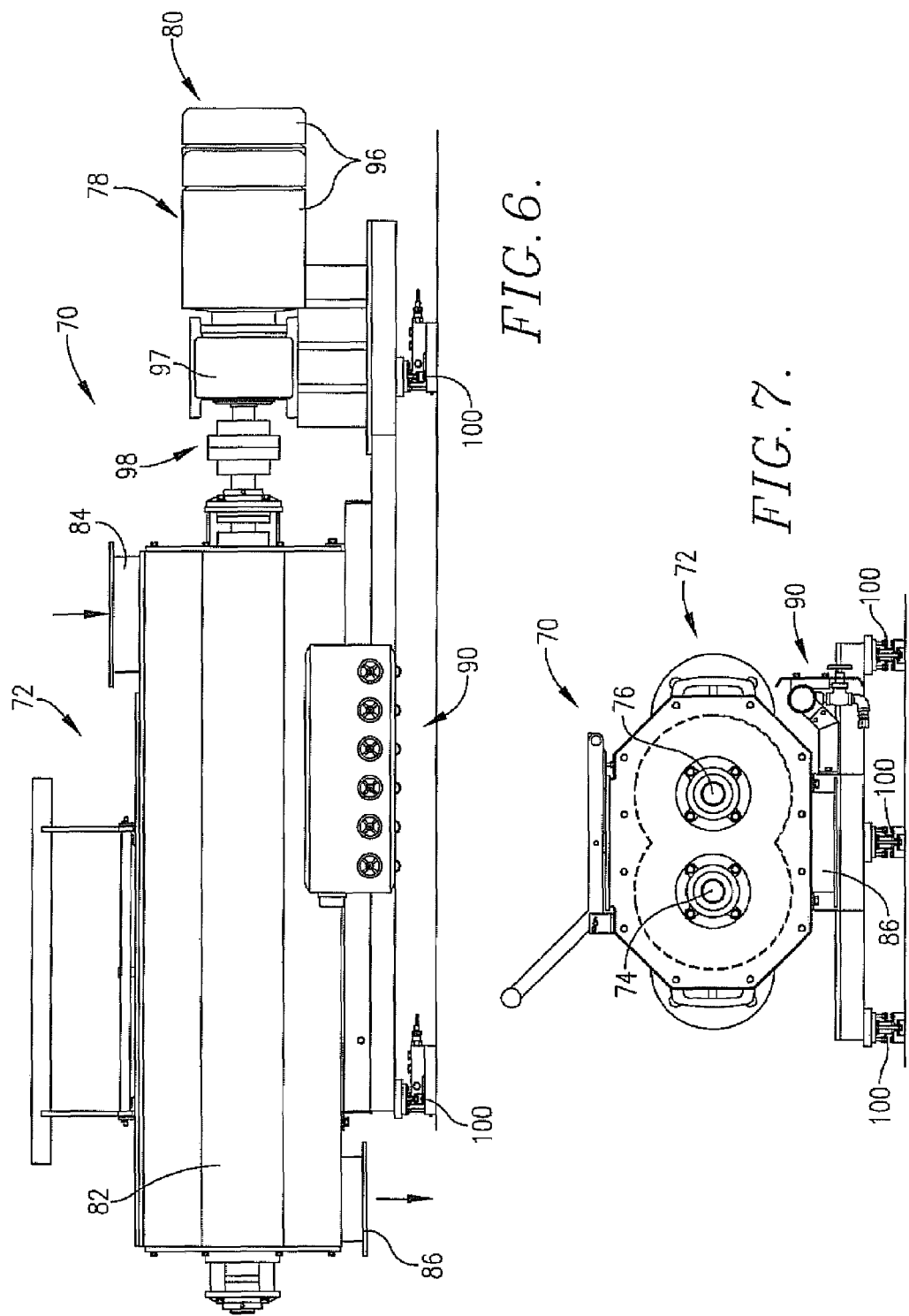

PRECONDITIONER HAVING MIXER SHAFTS INDEPENDENTLY DRIVEN WITH VARIABLE FREQUENCY DRIVES

BACKGROUND OF THE INVENTION

1. Field of the Invention

The present invention is broadly concerned with improved, dual mixing shaft preconditioners of the type used upstream of processing devices such as extruders or pellet mills in the production of animal feeds or human foods. More particularly, the invention is concerned with such preconditioners, and processing systems making use thereof, wherein the preconditioners include variable drive mechanisms operably coupled with the mixing shafts and designed to permit selective rotation of the shafts at individual rotational speeds independent of each other.

2. Description of the Prior Art

Preconditioners are widely used in combination with extruders for preparing and blending food materials before further processing and cooking of the same in an extruder. For example, products having a relatively high percentage of flour-like material are often blended with water and treated with steam in a conditioner prior to extrusion. Use of preconditioners is particularly advantageous in preparing products comprised of farinaceous material such as pet food containing a relatively large percentage of soy flour.

Conventional preconditioning apparatus often includes an elongated vessel having a pair of identical side-by-side, frustocylindrical, intercommunicated mixing chambers each presenting equal areas in transverse cross sections. Each chamber is provided with mixing bars or beaters radially mounted on the rotatable drive shaft aligned with the longitudinal axis of die chamber, and the beaters have a configuration for longitudinally advancing the product from an inlet end of the vessel toward an outlet end of the same as the materials are swept around the frustocylindrical walls. Also, the beaters of each chamber are configured to alternatively pass the product from one chamber to the other when the materials approach the intersection between the chambers.

A series of water inlets are often provided along at least a portion of the length of preconditioning vessels for adding water to the food materials during advancement of the latter longitudinally through the mixing chambers. Obviously, it is highly important that water introduced into preconditioning vessels becomes thoroughly and uniformly blended with materials having a flour-like consistency in order to avoid formation of lumps. Typically, lumps represent a non-homogeneous mixture of the material and water with the material forming the outer surface of the lump receiving the highest percentage of moisture.

Proper blending of water with materials having a flour-like consistency requires both appropriate residence time within the conditioning vessel as well as proper mixing or agitation of the materials with water. As such, increasing the rotational speed of the beaters of conventional preconditioners in an attempt to increase agitation within the vessel causes the materials to pass through the vessel at a greater speed which correspondingly reduces the residence time of the materials within the vessel to values that may be unacceptable. On the other hand, reducing the rotational speed of the beaters to increase residence time within the vessel adversely affects the mixing characteristics of the vessel to the point where proper blending of the materials with water is not achieved. Increasing the overall length of the vessel is not desirable because of mechanical problems associated with the mixing shafts.

Moreover, the structural nature of conventional preconditioning apparatus does not lend itself to flexibility of operation where it is desired, for example, to use one apparatus for processing different materials at varying flow rates. That is, temporarily increasing the length of the apparatus with modular vessel sections in an attempt to increase residence time of materials within the vessel is not a satisfactory solution due to the inherent weight and structural characteristics of the apparatus as well as the predefined material inlets and outlets which are often located at specified positions to pass the materials from one processing stage to the next. As such, it would be desirable to provide a means for varying the residence time of materials passing through a preconditioning apparatus to enable the latter to process different types of materials at optionally varying flow rates.

U.S. Pat. No. 4,752,139 (incorporated by reference herein) describes a class of preconditioners having differently-sized, arcuate mixing chambers with a mixing shaft along the center line of each chamber. The mixing shafts include radially-extending, intercalated mixing elements. In the preconditioners of the '139 patent, the shafts are powered through a single drive motor, using appropriate gearing to maintain a constant speed differential (usually 2:1) between the mixing shafts. These preconditioners are commercialized by Wenger Mfg. Co. of Sabetha, Kans. and have proven to be a significant improvement in the art by increasing system through-puts without corresponding additional operating costs. However, the fixed speed differential design of the preconditioners of the '139 patent can sometimes represent an operational drawback by limiting the range of operational parameters which may otherwise be desirable.

SUMMARY OF THE INVENTION

The present invention overcomes the problems outlined above and provides dual shaft preconditioners capable of independent shaft rotational speeds. Broadly, the preconditioners of the invention comprise an elongated mixing vessel having a material inlet and a material outlet, with a pair of elongated mixing shafts each having a plurality of mixing elements, the shafts located in laterally spaced apart relationship within the vessel. A pair of variable drive mechanisms respectively are coupled with the shafts in order to permit selective rotation of ale shafts at individual rotational speeds independent of each other. Such shaft rotation is controlled by means of a controller operably coupled with the drive mechanisms to independently control the rotational speed of the shafts.

In preferred forms, the preconditioner mixing vessel includes a pair of arcuate, juxtaposed, intercommunicated chambers of different cross-sectional areas, each equipped with a mixing shaft substantially along the center line thereof. In addition, the preconditioner is preferably supported on a weighing device to weigh the contents of the preconditioner during use thereof, thereby affording a means to readily alter the material retention time within the preconditioner. The weighing device is normally in the form of a plurality of load cells operatively coupled with the preconditioner controller.

In alternate forms, the preconditioner may be of the type having juxtaposed, intercommunicated chambers of the same cross sectional area, each equipped with a mixing shaft along the centerline thereof. This type of preconditioner may also be equipped with weighing devices so as to facilitate easy changes of retention time.

BRIEF DESCRIPTION OF THE DRAWINGS

FIG. 1 is a somewhat schematic plan view of a preconditioner in accordance with the invention;

FIG. 2 is a front elevational view of the preconditioner of FIG. 1;

FIG. 3 is a side elevational view of the preconditioner of FIG. 1;

FIG. 4 is a sectional view taken along line 4-4 of FIG. 3;

FIG. 5 is a schematic diagram of the interconnection between the preconditioner of the invention and an extruder;

FIG. 6 is a side view of another type of preconditioner in accordance with the invention;

FIG. 7 is an end view thereof; and

DETAILED DESCRIPTION OF THE PREFERRED EMBODIMENT

Embodiment of FIGS. 1-5

Figure 8:
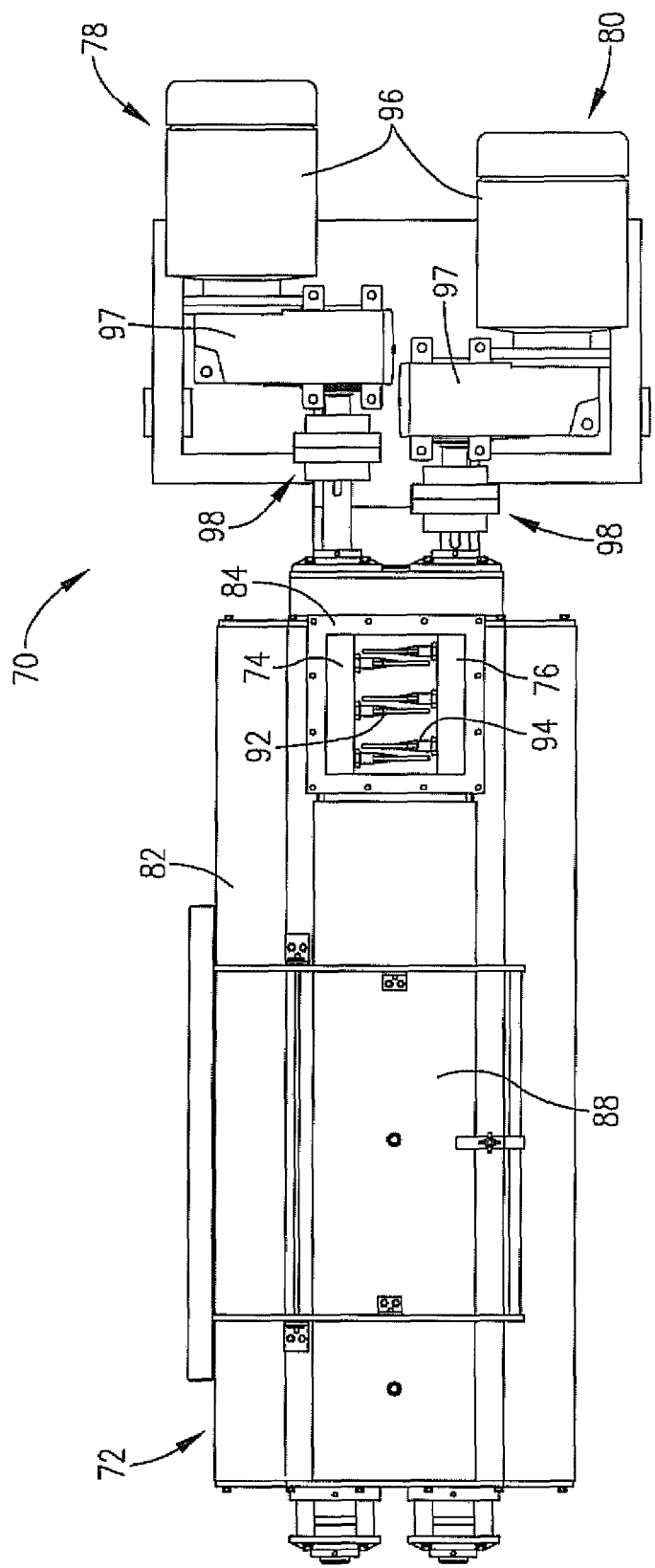
FIG. 8 is a plan view thereof.

Turning now to the drawings, an improved preconditioner 10 is depicted in FIGS. 1-4. Broadly, the preconditioner 10 includes an elongated mixing vessel 12 with a pair of parallel, elongated, axially-extending mixing shafts 14 and 16 within and extending along the length thereof. The shafts 14, 16 are operably coupled with individual variable drive devices 18 and 20, the latter in turn connected with digital controller 22. The preconditioner 10 is adapted for use with a downstream processing device such as an extruder or pellet mill. As depicted in FIG. 5, the preconditioner 10 is coupled with an extruder 24 (which may be of the single or twin screw variety) having an inlet 26 and a restricted orifice die outlet 28, as well as an internal, axially rotatable screw.

In more detail, the vessel 12 has an elongated, transversely arcuate sidewall 30 presenting a pair of elongated, juxtaposed, intercommunicated chambers 32 and 34, as well as a material inlet 36 and a material outlet 38. The chamber 34 has a larger cross-sectional area than the adjacent chamber 32, as will be readily apparent from a consideration of FIG. 4. The sidewall 30 has access doors 40 and is also equipped with injection assemblies 42 for injection of water and/or steam into the confines of vessel 12 during use of the preconditioner, and a vapor outlet 44. The opposed ends of vessel 12 have end plates 46 and 48, as shown.

Each of the shafts 14, 16 has a plurality of radially outwardly-extending mixing elements 50 and 52 which are designed to agitate and mix material fed to the preconditioner, and to convey the material from inlet 36 towards and out outlet 38. It will be observed that the elements 50 are axially offset relative to the elements 52, and that the elements 50, 52 are intercalated (i.e., the elements 52 extend into the cylindrical operational envelope presented by shaft 14 and elements 50, and vice versa). Although the elements 50, 52 are illustrated as being substantially perpendicular to the shafts 14, 16, the invention is not so limited; rather, the elements 50, 52 are adjustable in both length and pitch, at the discretion of the user. Again referring to FIG. 4, it will be seen that the shaft 14 is located substantially along the center line of chamber 32, and that shaft 16 is likewise located substantially along the center line of the chamber 34.

The drives 18 and 20 are in the illustrated embodiment identical in terms of hardware, and each includes a drive motor 54, a gear reducer 56, and coupling assembly 58 serving to interconnect the corresponding gear reducer 56 and motor 54 with a shaft 14 or 16. The drives 18 and 20 also preferably have variable frequency drives 59 which are designed to permit selective, individual rotation of the shafts 14, 16 in terms of speed and/or rotational direction independently of each other. In order to provide appropriate control for the drives 18 and 20, the drives 57 are each coupled with a corresponding motor 54 and a digital controller 60. The controller 60 is itself entirely conventional, and may be in the form of a programmable logic controller (PLC) or computer. The drives 57 may be programmed as desired to achieve the ends of the invention, e.g., they may be configured for different rotational speed ranges, rotational directions and power ratings.

In preferred forms, the preconditioner 10 is supported on a weighing device in the form of a plurality of load cells 62, which are also operatively coupled with controller 60. The use of load cells 62 permits rapid, on-the-go variation in the retention time of material passing through vessel 12, as described in detail in U.S. Pat. No. 6,465,029, incorporated by reference herein.

The use of the preferred variable frequency drive mechanisms 18, 20 and controller 60 allow high-speed adjustments of the rotational speeds of the shafts 14, 16 to achieve desired preconditioning while avoiding any collisions between intermeshing mixing elements 50, 52. In general, the controller 60 and the coupled drives 57 communicate with each drive motor 54 to control the shaft speeds. Additionally, the shafts 14, 16 can be rotated in different or the same rotational directions at the discretion of the operator.

Retention times for material passing through preconditioner 10 can be controlled manually by adjusting shaft speed and/or direction, or, more preferably, automatically through controller 60. Weight information from the load cells 62 is directed to controller 60, which in turn makes shaft speed and/or directional changes based upon a desired retention time.

The preconditioner 10 is commonly used for the processing of animal feed or human food materials, such as grains (e.g., wheat, corn, oats, soy), meat and meat by-products, and various additives (e.g., surfactants, vitamins, minerals, colorants). Where starch-bearing grains are processed, they are typically at least partially gelatinized during passage through the preconditioner. The preconditioner 10 is usually operated at temperatures of from about 100-212 degrees F., residence times of from about 30 seconds-5 minutes, and at atmospheric or slightly above pressures.

The drive arrangement for the preconditioner 10 has the capability of rotating the shafts 14, 16 at variable speeds of up to about 1,000 rpm, more preferably from about 200-800 rpm. Moreover, the operational flexibility of operation inherent in the preconditioner design allows for greater levels of cook (i.e., starch gelatinization) as compared with similarly sized conventional preconditioners.

Embodiment of FIGS. 6-8

This embodiment is in many respects similar to that described above, and provides a preconditioner 70 having an elongated mixing vessel 72 with a pair of parallel, elongated, axially-extending shafts 74, 76 within and extending along the length thereof. The shaft 74, 76 are operably coupled with individual variable drive devices 78, 80, the latter in turn connected with digital controller (not shown) similar to controller 22 described previously. The preconditioner 70 may be used with downstream processing equipment such as extruders or pellet mills.

The vessel 72 has an elongated, transversely arcuate sidewall 82 presenting a pair of elongated, juxtaposed, intercommunicated chambers of equal cross sectional area, as well as a material inlet 84 and a material outlet 86. The sidewall 82 has an access door 88 and is also equipped with injection assemblies 90 for injection of water and/or steam into the vessel 82 during use of the preconditioner.

As in the first embodiment, each of the shafts 74, 76 has a plurality of outwardly extending mixing elements 92, 94 mounted thereon and normally extending the full length of the respective shafts. The elements 92, 94 are axially offset and intercalated as illustrated in FIG. 8, and are designed to agitate and mix material fed to the preconditioner and to convey the material from inlet 84 toward an out outlet 86.

The drives 78, 80 are identical, each having a drive motor 96, gear reducer 97 and coupler 98. The drives are preferably variable frequency drives designed to present selective, individual rotation of the shafts 74, 76 independently of each other.

The preconditioner 70 is supported on a weighing device comprising a plurality of load cells 100 which are operatively coupled with the preconditioner controller. The load cell permits variation in retention time all as described in U.S. Pat. No. 6,465,029.

The preconditioner 72 may be used in the same fashion and under the same general operative parameters as described in connection with the embodiment of FIGS. 1-5

We claim:

1. A preconditioner, comprising:
   an elongated mixing vessel having a material inlet and a material outlet and configured to receive a material to be processed including a plurality of different ingredients;
   apparatus operable to deliver moisture into said mixing vessel during processing of said material;
   a pair of elongated mixing shafts each having a plurality of elongated, outwardly extending mixing elements, said shafts located in laterally spaced apart relationship within said vessel with the elements of each shaft being intercalated with the elements of the other shaft, said elements oriented to avoid any collision between the elements during rotation of said shafts;
   a pair of variable drive mechanisms respectively coupled with said shafts in order to permit selective rotation of the shafts at individual rotational speeds independent of each other and to allow high-speed adjustment of said rotational speeds of said shafts without collision between said mixing elements; and
   a controller operably coupled with said drive mechanisms to independently control the rotational speed of said shafts.

2. The preconditioner of claim 1, said drive mechanisms each comprising a variable frequency drive.

3. The preconditioner of claim 1, including a weighing device operably coupled with said vessel in order to weigh the contents of the vessel during use of the preconditioner.

4. The preconditioner of claim 3, said weighing device comprising a plurality of load cells.

5. The preconditioner of claim 1, said vessel having elongated, transversely arcuate walls presenting a pair of elongated, juxtaposed, intercommunicated chambers, one of said chambers having a greater cross-sectional area than the other of said chambers.

6. The preconditioner of claim 5, said shafts each located substantially at the center of a corresponding chamber and extending along the length thereof.

7. The preconditioner of claim 1, said inlet and outlet being located respectively adjacent opposed ends of said vessel.

8. The preconditioner of claim 1, said apparatus operable for injection of water and/or steam into said vessel.

9. The preconditioner of claim 1, said shafts operable to rotate in opposite directions, respectively.

10. A processing system, comprising:
    a processing device presenting a processing chamber with an inlet and an outlet;
    a preconditioner comprising
        an elongated mixing vessel having a material inlet and a material outlet and configured to receive a material to be processed including a plurality of different ingredients, said preconditioner outlet operably coupled with said chamber inlet;
    apparatus operable to deliver moisture into said mixing vessel during processing of said material;
    a pair of elongated mixing shafts each having a plurality of elongated, outwardly extending mixing elements, said shafts located in laterally spaced apart relationship within said vessel with the elements of each shaft being intercalated with the elements of the other shaft, said elements oriented to avoid any collision between the elements during rotation of said shafts;
    a pair of variable drive mechanisms respectively coupled with said shafts in order to permit selective rotation of the shafts at individual rotational speeds independent of each other and to allow high-speed adjustment of said rotational speeds of said shafts without collision between said mixing elements; and
    a controller operably coupled with said drive mechanisms to independently control the rotational speed of said shafts.

11. The system of claim 10, said drive mechanisms each comprising a variable frequency drive.

12. The system of claim 10, including a weighing device operably coupled with said vessel in order to weigh the contents of the vessel during use of the preconditioner.

13. The system of claim 12, said weighing device comprising a plurality of load cells.

14. The system of claim 10, said vessel having elongated, transversely arcuate walls presenting a pair of elongated, juxtaposed, intercommunicated chambers, one of said chambers having a greater cross-sectional area than the other of said chambers.

15. The system of claim 14, said shafts each located substantially at the center of a corresponding chamber and extending along the length thereof.

16. The system of claim 10, said inlet and outlet being located respectively adjacent opposed ends of said vessel.

17. The system of claim 10, said apparatus operable for injection of water and/or steam into said vessel.

18. The system of claim 10, said shafts operable to rotate in opposite directions, respectively.

19. The system of claim 10, said device comprising an extruder.

20. A method of preconditioning a material comprising the steps of:
    providing a preconditioner including an elongated mixing vessel having a material inlet and a material outlet, a pair of elongated mixing shafts, each of said shafts having a plurality of elongated, outwardly extending mixing elements thereon and located in laterally spaced apart relationship within said vessel, with the elements of each shaft being intercalated with the elements of the other shaft, said elements oriented to avoid any collision between the elements during rotation of said shafts;
    directing a quantity of said material including a plurality of different ingredients into said vessel through said inlet, and introducing moisture into the vessel to mix with said material; and selectively rotating said shafts at respective rotational speeds independent of each other in order to precondition said material and move the material toward and out said vessel outlet, without collision between said mixing elements.

21. The method of claim 20, including the step of using a digital controller to independently control the rotational speeds of said shafts.

22. The method of claim 20, said material comprising a food or feed material.

23. The method of claim 22, said material being a starch-bearing material, and said material being at least partially gelatinized during passage through said preconditioner.

24. The method of claim 20, including the step of adjusting the rotational speed of said shafts during high-speed rotation thereof.

* * * * *